United States Patent [19]

Smith

[11] 4,301,832

[45] Nov. 24, 1981

[54] PRESSURE CONVERTER VALVE

[76] Inventor: Dale R. Smith, 27944 Roy, St. Clair Shores, Mich. 48081

[21] Appl. No.: 150,818

[22] Filed: May 19, 1980

[51] Int. Cl.[3] ............ F16K 15/04

[52] U.S. Cl. ............ 137/512; 91/526; 91/530; 137/884

[58] Field of Search ............ 91/517, 526, 530, 531; 137/512, 884, 106; 210/134, 136; 417/315

[56] References Cited

U.S. PATENT DOCUMENTS

| | | | |
|---|---|---|---|
| 2,437,113 | 3/1948 | Montelius | 137/512 X |
| 3,100,965 | 8/1963 | Blackburn | 60/375 |
| 3,225,786 | 12/1965 | Elliot | 137/512 |
| 3,256,908 | 6/1966 | Mann | 137/512 X |
| 3,322,281 | 5/1967 | Gulick | 137/512 X |
| 3,512,453 | 5/1970 | Balzer | 91/526 |
| 3,679,179 | 7/1972 | Praddaude | 91/517 X |
| 3,680,589 | 8/1972 | Jeans | 137/884 |
| 3,850,081 | 11/1974 | Joelson | 91/517 X |
| 4,003,397 | 1/1977 | Cooper | 210/136 X |

*Primary Examiner*—Robert G. Nilson
*Attorney, Agent, or Firm*—Basile, Weintraub & Hanlon

[57] ABSTRACT

A pressure converter valve suitable for use in fluid flow systems. The pressure converter valve comprises a solid body having a plurality of interconnected bores formed therein with unidirectional flow devices located within certain of the bores to form parallel flow paths between the inlet and outlet ports of the pressure converter valve such that fluid flows in a first direction through one of the outlet ports and in a second direction through the other of the outlet ports regardless of the direction of fluid flow through the inlet ports. The pressure converter valve is adapted to have an auxiliary fluid control valve mounted thereto in fluid flow communication with the outlet ports of the pressure converter valve and, further, includes fluid flow paths connecting the outlet ports of the auxiliary valve to an auxiliary fluid operated device which is controlled by the auxiliary valve.

6 Claims, 6 Drawing Figures

PRESSURE CONVERTER VALVE

BACKGROUND OF THE INVENTION

1. Field Of The Invention

This invention relates, in general, to fluid control valves and, more specifically, to pressure converter valves.

2. Description Of The Prior Art

Fluid flow control valves find wide spread use in industry to control the movement of fluid operated devices such as cylinders and motors. Such valves are connected via piping to a source of high pressure fluid, such as a hydraulic pump, and to a return tank or reservoir such that fluid flows under high pressure through the valves from the source to the cylinders or motors causing the desired movement thereof and returns under low pressure from the cylinders through the valves to the tank.

These valves are typically connected in a group on a manifold arrangement to the source and return tank and provide at their output ports fluid under high pressure from the source and fluid under low pressure returning to the tank.

It is often necessary to add additional valves to an existing machine in order to provide additional movement or desired operations on the machine. However, this has presented several problems utilizing prior art control valves since the piping to the cylinders, which must be tapped or broken into in order to add the extra valve, alternately switches between high and low pressure. This makes the operation of the additional device dependent upon the direction of fluid flow through the preceding valve, which is unworkable.

As shown in U.S. Pat. No. 3,256,908, it has been proposed to provide a plurality of unidirectional flow devices or check valves to assure that a first fluid flow path is a source of fluid to the device and a second fluid flow path receives fluid from the device without regard for the direction of fluid flow in the valves preceding the device. Although this arrangement functions satisfactorily, the use of individual check valves requires considerable time and expense for installation and consumes space that is often not available on a complex machine tool.

Thus, it would be desirable to provide a pressure converter valve which overcomes the problems of prior art attempts to provide fluid flow paths that provide the same fluid flow pressure regardless of the direction of fluid flow input to the converter valve. It would also be desirable to provide a pressure converter valve arrangement which is simple and easy to install and requires a minimum amount of space. It would also be desirable to provide a pressure converter valve arrangement which is suitable for use with conventional, standardized fluid flow control valves. Finally, it would be desirable to provide means for mounting an auxiliary valve and fluid operated device in fluid communication with the pressure converter valve without the use of additional piping.

SUMMARY OF THE INVENTION

There is disclosed herein a pressure converter valve suitable for use in fluid flow systems and in particular for use with fluid operated machine tools. The pressure converter valve comprises a solid body having a plurality of interconnected bores formed therein with unidirectional flow devices located within certain of the bores to form parallel flow paths between the inlet and outlet ports of the pressure converter valve such that fluid flows in a first direction through one of the outlet ports and in a second opposed direction through the other outlet port regardless of the direction of fluid flow through the inlet ports of the pressure converter valve.

The pressure converter valve body is adapted for having an auxiliary fluid control valve mounted directly thereto in fluid flow communication with the outlet ports of the pressure converter valve and, further, includes additional fluid flow paths which connect the outlet ports of the auxiliary valve to an additional fluid operated device.

The pressure converter valve of this invention is adapted for easy and quick installation on an existing machine tool without the need for additional piping and extra fluid control devices. In addition, the pressure converter valve enables auxiliary valves and piping to fluid operated control devices to be easily connected thereto. Further, the outlet ports of the pressure converter valve and the additional set of inlet ports connecting the auxiliary valve to its controlled fluid operated device are arranged in the standard hold pattern provided in conventional fluid control valves thereby providing simplified means for mounting the fluid control valve directly to the pressure converter valve.

BRIEF DESCRIPTION OF THE DRAWING

The various features, advantages and other uses of this invention will become more apparent by referring to the following detailed description and drawing in which.

DESCRIPTION OF THE PREFERRED EMBODIMENTS

Figure 1:
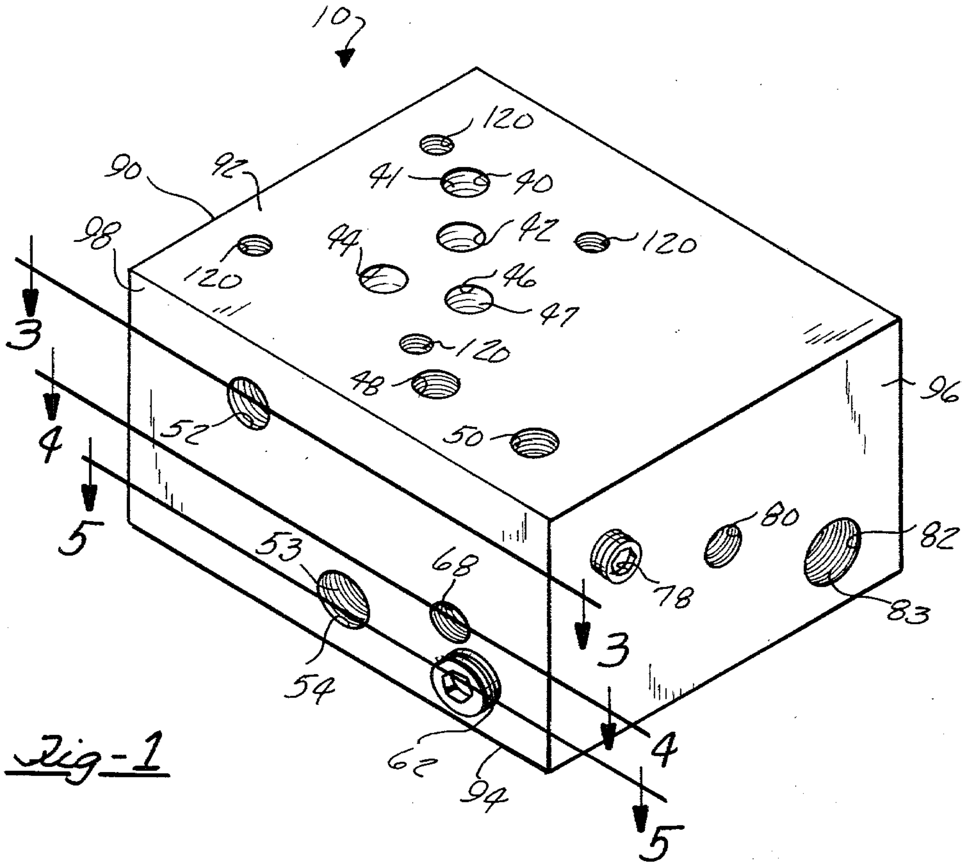
FIG. 1 is a perspective view of the pressure converter valve constructed according to the teachings of this invention.

Throughout the following description and drawing, identical reference numbers are used to refer to the same component shown in multiple figures of the drawing.

Referring now to the drawing, and to FIG. 1 in particular, there is illustrated a pressure converter valve 10 suitable for use in fluid flow systems and, in particular, in fluid operated machine tools. The pressure converter valve 10 is intended to provide a means for attaching additional fluid control valves to an existing machine tool without regard for the direction of fluid flow in the fluid lines preceding the pressure converter valve.

In general, the pressure converter valve 10 comprises a solid body having a plurality of interconnected bores formed therein. A pair of inlet ports and a pair of outlet ports are provided at the exterior ends of certain of the internal bores. A plurality of unidirectional flow devices are disposed in certain of the bores such that fluid flows in a first direction through one of the outlet ports and in a second direction through the other outlet port regardless of the direction of fluid flow through the inlet ports of the pressure converter valve 10.

Figure 2:
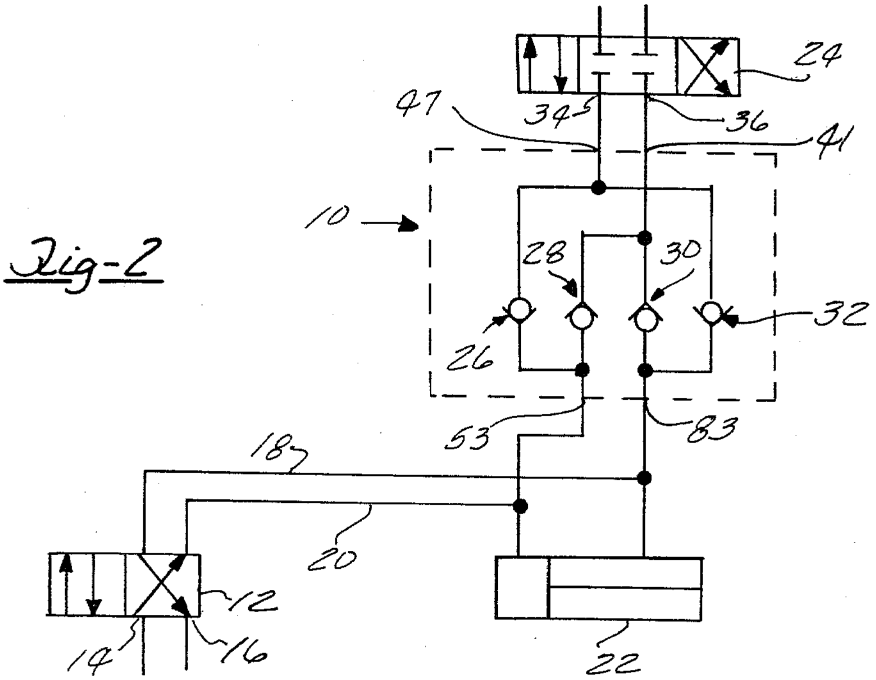
FIG. 2 is a schematic view of the internal fluid flow paths of the pressure converter valve illustrated in FIG. 1 and a preferred method of connecting the pressure converter valve to external control valves and fluid operated devices.

The pressure converter valve 10 enables additional control valves to be added to an existing machine tool. As shown in FIG. 2, the existing control valves on a machine tool are conventionally arranged on a common manifold with the last valve in line illustrated symbolically at reference number 12. The inlet ports 14 and 16 of the valve 12 are respectively connected to a source of high pressure fluid, such as an hydraulic pump, and a low pressure return line to a reservoir or return tank. The outlet ports of the control valve 12 are connected via lines 18 and 20 to a fluid operated device, such as a cylinder 22. The control valve 12 is switchable between two positions such that the cylinder 22 may be extended and retracted as desired. It is imperative for the proper operation of the pressure control valve 10 that the pressure converter valve 12 be connected such that fluid flow through one of the inlet ports is always at high pressure. Thus, the outlet lines which are broken into or tapped in order to connect the pressure concerter valve 10 to the existing piping should be connected to a two-position, four-way valve, that is, not a blocked center valve.

As noted above, it is often necessary to add an additional control valve, such as control valve 24, to an existing machine tool to add another mode of operation to the machine tool. The pressure converter valve 10 of this invention enables the additional control valve 24 to be added and to operate properly regardless of the direction of fluid flow in the outlet lines 18 and 20 to which the pressure converter valve 10 is connected.

This is accomplished by disposing undirectional flow valves at predetermined locations within certain of the internal bores within the pressure converter valve 10. The undirectional flow valve and the interconnecting bores are shown symbolically in FIG. 2. Four unidirectional control devices 26, 28, 30 and 32 are provided within the pressure converter valve 10 and are arranged in two parallel pairs, with the unidirectional flow devices in each pair disposed for fluid flow in the same direction. In this manner, fluid flows through one outlet port of the pressure converter valve 10 into the inlet port 34 of the auxiliary valve 24 in a first direction through either of flow devices 26 or 32 and fluid returns from the inlet port 36 in the valve 24 through the other outlet port of the pressure converter valve 10 in a second or opposed direction through flow devices 28 or 30 thereby insuring proper operation of the auxiliary valve 24 regardless of the direction of fluid flow in the lines 18 and 20.

As shown in FIG. 1, the pressure converter valve 10 comprises a solid body 90 which is preferably formed of a metallic material, such as steel. The body 90 has a substantially rectangular cross section with a top surface 92, a bottom surface 94 and side surfaces 96, 98, 100 and 102.

The body 90 has a plurality of bores, such as bore 50, formed therein. The bores extend from the exterior surface of the body 90 into the interior thereof. The bores, further, are arranged such that certain of the bores intersect to form fluid flow paths between a pair inlet ports 53 and 83 and a pair of outlet ports 41 and 47. The bores have varying diameters so as to enable connection to exterior piping, devices and to house internally disposed undirectional flow devices and to interconnect certain of the bores, as described in greater detail hereafter.

Figure 3:
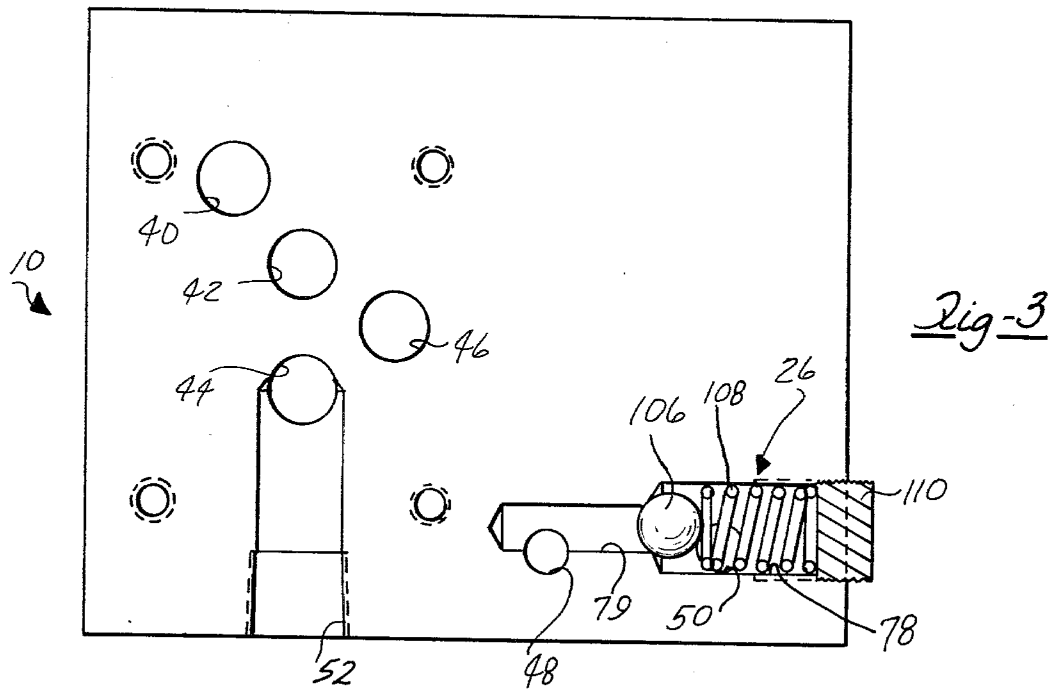
FIG. 3 is a cross sectional view, generally taken along line 3—3 in FIG. 1.

A plurality of unidirectional flow devices are disposed within certain of the bores so as to permit fluid flow therethrough in only one selected direction. Preferably, the unidirectional flow devices comprise check valves. As the construction of each of the check valves 26, 28, 30 and 32 is identical, only a detailed description of the construction of check valve 26 will be described; it being understood that similar components form the remaining check valves. As shown in FIG. 3, the unidirectional flow device 26 comprising a check valve includes a ball 106 having a diameter greater than the diameter of the adjacent portion of the bore, such as bore 79, next to which it is disposed. Suitable biasing means 108 for urging the ball 106 into registry with the opening of the 79 bore is provided within an enlarged portion 78 of the bore. Preferably, the biasing means 108 comprises a coil spring which urges the ball 106 into registry with the end of the bore 79 to thereby close the bore 79 when fluid flow enters the bore from the base of the spring 108. However, when fluid flow enters the bore 79 on the opposite side of the ball 106 from the spring, the pressure of the fluid flow is sufficient to overcome the biasing force exerted by the spring 108 such that the ball 106 is driven away from the end of the bore 79 thereby opening the bore 79 and the contiguous bore 78 to fluid flow therethrough. A suitably formed seat or plug 110 is threadably engaged within the enlarged bore 78 and forms a seat for the spring 108 to maintain the spring in the desired position within the bore.

Figure 4:
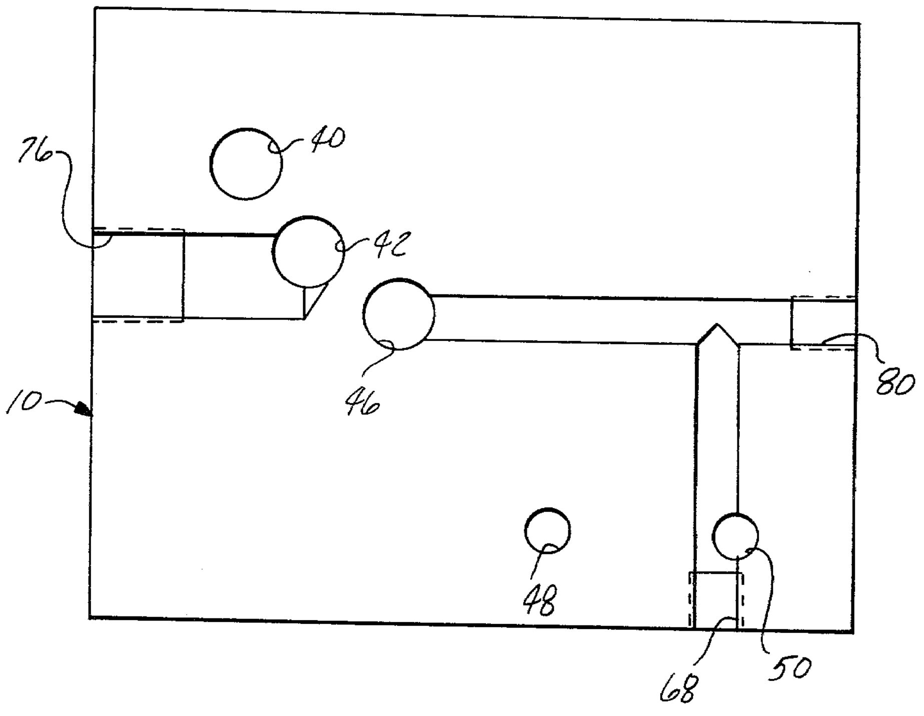
FIG. 4 is a cross sectional view, generaly taken along line 4—4 in FIG. 1.
Figure 5:
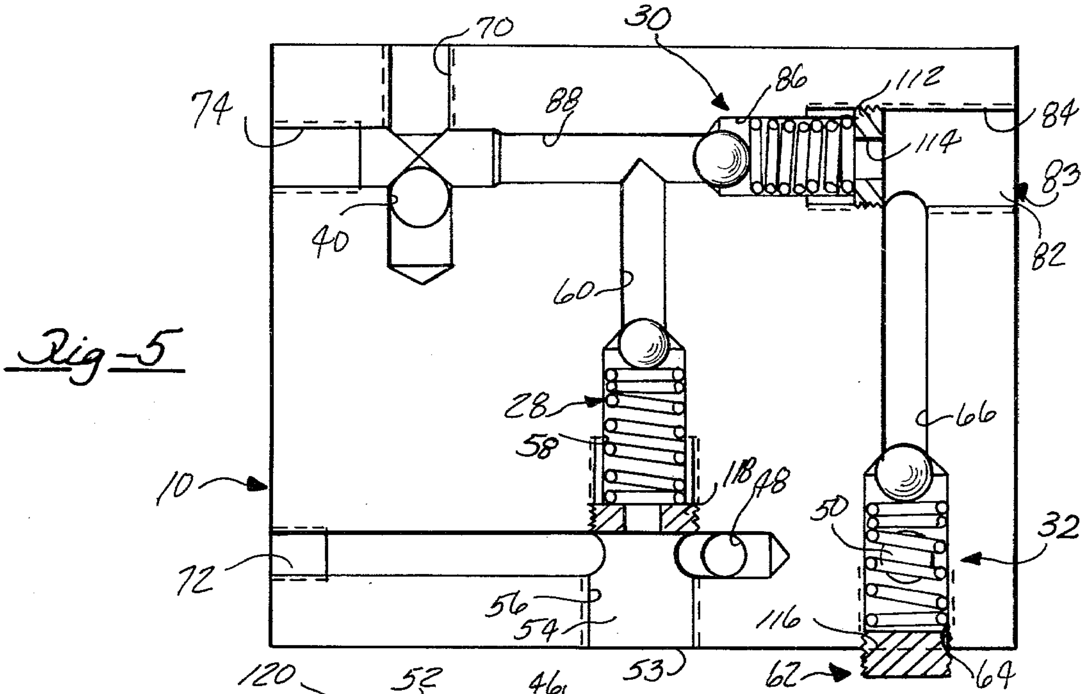
FIG. 5 is a cross sectional view, general taken along line 5—5 in FIG. 1.

Turning now to FIGS. 3-7, the arrangement of the unidirectional flow devices and the interconnection of the bores within the body 90 of the pressure converter valve 10 will now be described. Initially, the fluid flow path from the inlet 83 of the pressure converter valve 10 to the outlet port 47 will be described. As shown in FIG. 5, the inlet port 83 is formed at the end of a horizontally extending bore 82 in the body 90. The bore 82 has a first end portion 84 of enlarged diameter, an intermediate portion 86 of reduced diameter and a third or end portion 88 of smaller diameter. Check valve 30 is disposed within the intermediate portion 36 of the bore 82 and is seated therein by seat 112 which has a drilled opening 114 therein for fluid flow through the seat, as described in greater detail hereafter. Check valve 30 is situated within the bore 82 such that fluid flow through the bore 82 is only in the direction from the third portion 88 to the first portion 84. Another horizontally extending bore 62 is disposed within the body 90 and intersects with the first portion 84 of the bore 82. The bore 62 has a first end portion 64 of an enlarged diameter and a second portion 66 of reduced diameter which intersects with the bore 82. Check valve 32 is mounted within the enlarged portion 64 of the bore 62 and is retained in position by plug 116. A vertically extending bore 50 intersects the enlarged portion 64 of the bore 62 and further intersects with another horizontally extending bore 68, as shown in FIG. 4. The bore 68 intersects with a horizontally extending bore 80 which communicates with a vertically extending bore 46 which forms the outlet port 47 at its exterior end thereof.

A second fluid flow path exists from inlet port 53 through bore 54, shown in FIG. 5. The bore 54 has an end portion 56 of enlarged diameter, an intermediate portion 58 of reduced diameter and an end portion 60 of further reduced diameter. Check valve 28 is disposed within the intermediate portion 58 of the bore 54 and seats against seat 118 which has a fluid flow opening formed therein. The check valve 28 is disposed so as to enable fluid flow therethrough only in the direction from the end portion 60 to the first portion 56 of the bore 54. The enlarged end portion 56 of the bore 54 intersects with another horizontally extending bore 72. The end of bore 72 communicates with a vertically extending bore 48, as shown in FIG. 5. The other end of the bore 48 communicates with bore 78, shown in FIG. 3. The bore 78 has an enlarged end portion housing the check valve 26 and an end portion 79 which intersects with the vertically extending bore 48. The check valve 26 is disposed within the bore 78 to allow fluid flow therethrough in the direction from the end portion 79 to the enlarged portion 78. Another vertically extending bore 50 extends through the enlarged portion of the bore 78 and intersects bore 68, shown in FIG. 4. Bore 68 intersects bore 80 which, in turn, communicates with bore 46 which has outlet port 47 formed at the end thereof.

In this manner, two parallel fluid flow paths are formed within the pressure converter valve 10 from the inlet to the outlet to enable high pressure fluid to flow from either of the inlet ports 53 and 83 to the outlet port 47 regardless of which of the incoming lines 18 and 20 has high pressure fluid flowing therethrough.

The return to tank connection from the outlet port 41 to either of the inlet ports 53 or 83 is formed by a vertically extending bore 40 which intersects horizontally extending bore 70, as shown in FIG. 5. Bore 70 communicates with another horizontally extending bore 74 which is in line with the horizontally extending bore 82. The reduced end portion 60 of the bore 54 intersects the end portion 88 of the bore 82 thereby forming a tee connection with respect to bore 40 such that fluid flow through bores 54 and 82 can be only in the direction from bore 40 through the check valves 28 and 30 to the inlet ports 53 and 83. In this manner, a return low pressure path to the reserve tank is provided regardless of which of the lines 18 and 20 is at low pressure.

It should be noted that the bores forming the inlet ports 53 and 83 and the outlet ports 41 and 47 have tapped end portions adapted to receive a suitably formed threaded connector for connecting piping to the pressure converter valve 10 or for mounting the auxiliary control valve, as described in greater detail, hereafter directly to one surface of the pressure converter valve 10. In addition, the ends of the remaining bores, such as bore 62 in FIG. 5, are closed by suitably formed threaded plug, such as plug 116, which is threadably disposed within the end of the bore to seal the interior of the bore and form the desired fluid flow paths as described above.

Figure 6:
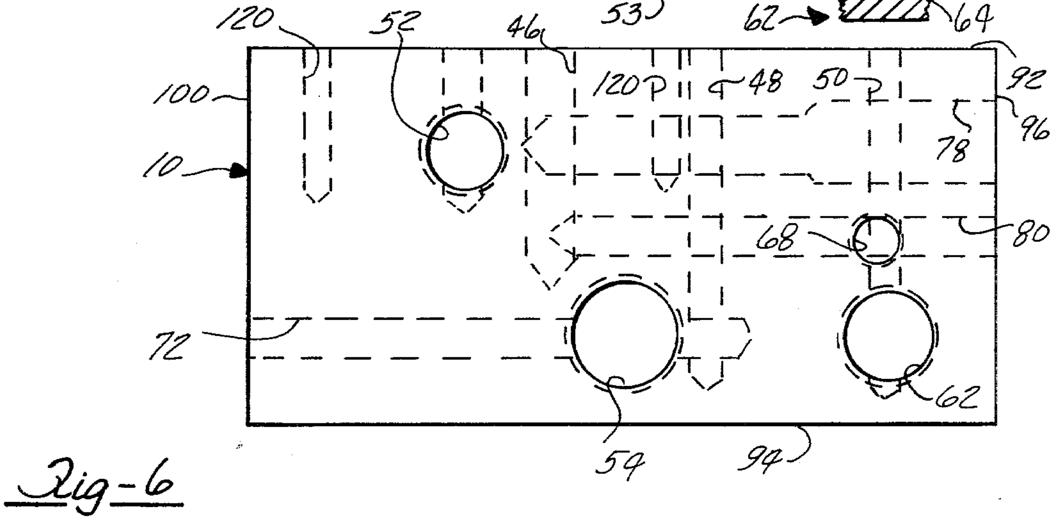
FIG. 6 is a side elevational view of the pressure converter valve illustrated in FIG. 1.
Figure 7:
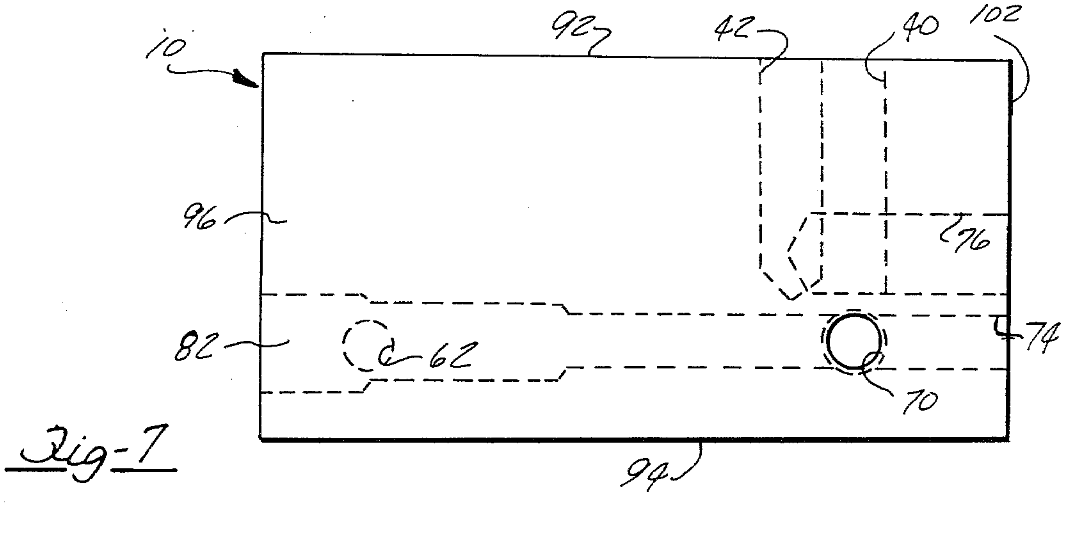
FIG. 7 is an opposed side elevational view of the pressure converter valve shown in FIG. 1.

Referring now to FIGS. 1, 3 and 6, there is illustrated means for mounting a fluid control valve having inlet and outlet ports on the body of the pressure converter valve 10 in fluid communication with the internal bores in the body 90 of the pressure converter valve 10. Conventional fluid flow control valves have a base with two inlet and two outlet ports formed therein. The base of the auxiliary control valve may be suitably mounted to the top surface 92 of the body 90 by means of threaded fasteners which are disposed through the base of the control valve and engage threaded bores 120 formed in the body 90.

In addition, means are provided within the pressure converter valve 10 for connecting an external fluid operated device, such as a cylinder, to the pressure converter valve 10. This connecting means comprises bores 42 and 44 in the pressure converter valve 10 which respectively communicate with horizontally extending bores 76 and 52. The bores 42 and 44 are adapted to be disposed in fluid communication with the outlet ports of the auxiliary control valve, with the bores 76 and 52 forming fluid flow paths to the auxiliary fluid operated device.

Preferably, the outlet ports 41 and 47 and the bores 42 and 44 in the body 90 of the pressure converter valve 10 are arranged in a predetermined hole pattern that corresponds to the inlet and outlet hole pattern of conventionally formed control valves. Thus, the pressure converter valve 10 may then be adapted to fit certain size ranges of auxiliary control valves; with different hole patterns provided for different sized control valves.

In summary, there has been disclosed herein a pressure control valve suitable for use in fluid flow systems. The pressure control comprises a solid body having a plurality of interconnected bores disposed therein, with unidirectional flow devices located in certain of the bores to form parallel flow paths between the inlet and outlet ports of the pressure converter valve such that fluid flows in a first direction through one of the outlet ports and in a second opposed direction through the other outlet port regardless of the direction of fluid flow through the inlet ports of the pressure control valve. In addition, the pressure converter valve is adapted to have an auxiliary control valve mounted directly thereto and for connecting the fluid operated device controlled by the auxiliary valve to the pressure converter valve thereby simplifying installation of the auxiliary control valve and the fluid operated device controlled thereby.

What is claimed is:

1. A pressure converter valve comprising:

a solid body;

a pair of first inlet ports and a pair of first outlet ports formed in said solid body;

said body including a plurality of interconnected bores;

a plurality of unidirectional fluid flow devices disposed within certain of said bores to form fluid flow paths between said first inlet and said outlet ports such that fluid flows in a first direction from one of said first outlet ports and in a second opposed direction through said other first outlet port regardless of the direction of fluid flow through said first inlet ports;

means for mounting a fluid control valve having inlet and outlet ports on said body of said pressure converter valve in fluid communication with the bores therein, the mounting means including first outlet ports in said body of said pressure converter valve being arranged to mate with said inlet ports of said fluid control valve;

said body having a pair of second inlet ports disposed adjacent to said pair of first outlet ports on said body and arranged to mate with said outlet ports of said fluid control valve; and said body having a pair of second outlet ports respectively disposed in fluid flow communication with said second pair of inlet ports on said body and adapted to be connected to a fluid operated device controlled by said fluid control valve.

2. The pressure converter valve of claim 1 wherein the unidirectional flow devices comprise check valves.

3. The pressure converter valve of claim 2 wherein the check valves comprise:

a ball;

means for biasing said ball into sealing position within a bore thereby closing off fluid flow through said bore; and seat means, securely disposed within said bore, for positioning said biasing means within said bore.

4. The pressure converter valve of claim 1 wherein the body includes four unidirectional flow devices arranged in two parallel disposed pairs, with the unidirectional flow devices in each pair disposed for fluid flow in the same direction.

5. The pressure converter valve of claim 1 wherein the bores extend inward from the surface of the body predetermined distances to connect with predetermined other bores to form fluid flow paths; and further including means, associated with certain of said bores, for sealingly closing the exterior end of said certain bores.

6. The pressure converter valve of claim 1 wherein the fluid flow through one of the inlet ports of the body of said pressure control valve is always at high pressure.

* * * * *